United States Patent [19]

Barnick

[11] Patent Number: 4,461,195
[45] Date of Patent: Jul. 24, 1984

[54] MULTI-MACHINE CUTTER HOLDER

[76] Inventor: John F. Barnick, 4101 W. 150th St., Cleveland, Ohio 44135

[21] Appl. No.: 362,141

[22] Filed: Mar. 26, 1982

[51] Int. Cl.³ .............................................. B23B 29/00
[52] U.S. Cl. .................... 82/36 R; 81/90 C; 83/666; 403/259; 403/260; 403/356; 408/203.5
[58] Field of Search ............... 82/36 R; 409/234; 408/203, 203.5; 83/666; 81/90 C; 403/260, 259, 360, 356, 261

[56] References Cited

U.S. PATENT DOCUMENTS

| 139,544 | 6/1873 | Clemmens | 83/666 |
| 173,126 | 2/1876 | Little | 83/666 |
| 185,847 | 1/1877 | Aldrich | 403/356 |
| 1,300,158 | 4/1919 | Geitner | 408/203.5 |
| 1,544,341 | 6/1925 | Osborn | 403/260 |
| 2,674,026 | 4/1954 | St. Palley | 83/666 |
| 3,339,458 | 9/1967 | Williams | 409/234 |
| 3,343,612 | 9/1967 | Flowers | 403/356 |

FOREIGN PATENT DOCUMENTS 878269   6/1953   Fed. Rep. of Germany ........ 83/666

Primary Examiner—W. D. Bray
Attorney, Agent, or Firm—Harvey B. Jacobson

[57] ABSTRACT

An adapter or machine tool holder for cutters and the like and having a centrally disposed flanged piece with a support means extending axially therefrom in one direction and a hub member axially projecting from the flanged piece in the other direction, abutment member or members extending from the surface of the flanged piece adjacent the hub for engaging a load element such as a cutter and the like for retaining the load element in engagement and preventing the load element from rotating on the holder independently thereof.

9 Claims, 3 Drawing Figures

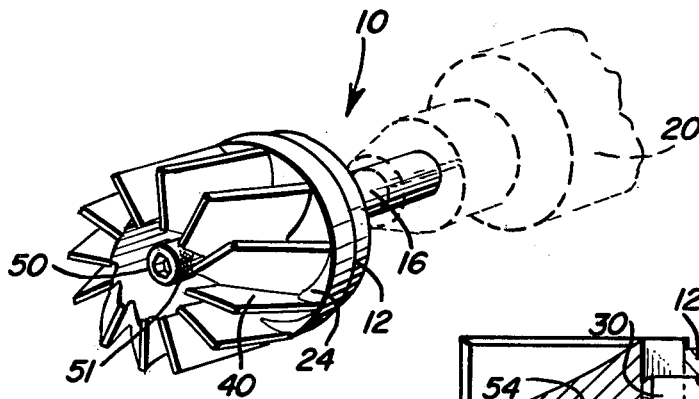
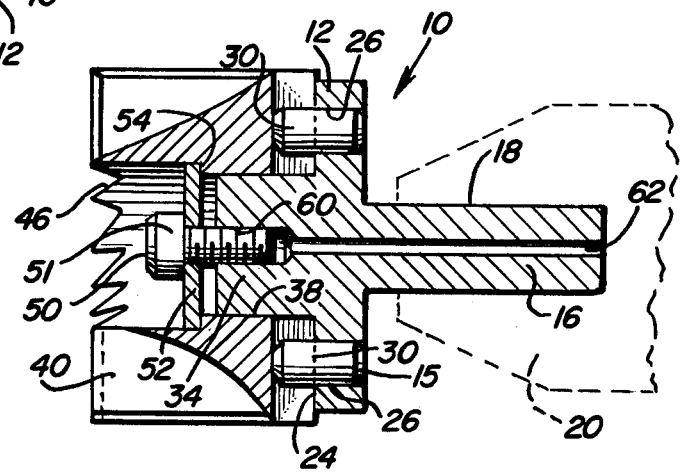
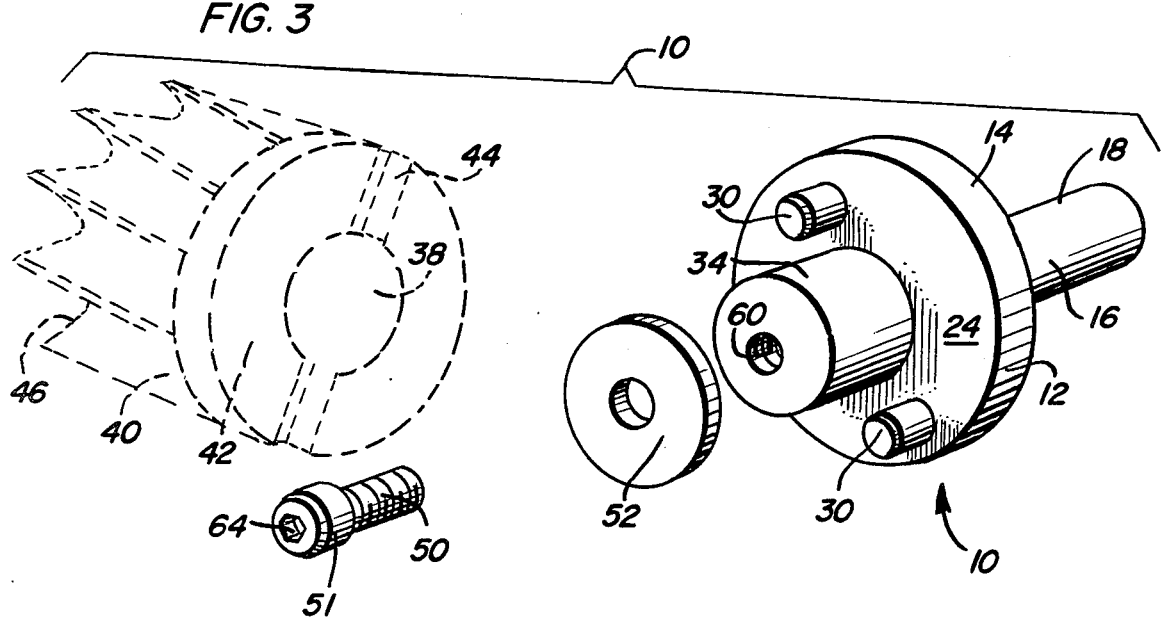

MULTI-MACHINE CUTTER HOLDER

BACKGROUND OF THE INVENTION

The present invention relates to rotational coupling means disposed on an adapter or holder for load elements or cutter heads and the like coupled to a hub of a holder mounted for rotation in any of several tools such as a table drill press, radial drill presses, vertical mill, horizontal mill, lathe tail stock, reamers and the like. More particularly, the invention relates to a multi-machine cutter holder and in which there is provided in the load element or cutter structure a key slot extending diametrically along a mating surface of the load element or cutter head having its face mating with or mounted upon the hub of the flanged element and in which abutmentmember or members are balanced about an axis of the flanged piece for preventing the load element from separately rotating independently of the holder.

FIELD OF THE INVENTION

There has been a need for providing an adapter or multi-machine holder for load elements that are simple in construction, far more versatile than couplings, chuck adapters, arbors and other mounting arrangements of the prior art and which are used in saving time during use as well as inexpensive in cost of manufacture and sale.

Particularly the invention is directed to the field of an adapter and tool combination that can be used for face milling, reaming, boring or side milling.

DESCRIPTION OF PRIOR ART

Various forms of holders and load support and coupler elements for adapters and the like useful in machine tool or machine cutter environments known in the U.S. patent art are as follows:

U.S. Pat. No. 2,051,965—J. T. Roth
U.S. Pat. No. 2,977,859—H. Glaser
U.S. Pat. No. 3,339,458—T. V. Williams
U.S. Pat. No. 3,413,889—M. A. Frank, Sr.
U.S. Pat. No. 3,830,135—Francis Sullivan
U.S. Pat. No. 4,120,224—W. M. Van Steenberg et al.

Several of these patents disclose various structures by which rotating tools, a blade or cutter is attached to a spindle or shaft or shaft adapter of a machine. The Van Steenberg et al. patent discloses dowels interconnecting a holder and saw blade with the dowels extending through the holes in the saw blade to prevent relative rotation between the blade and the holder. The Roth patent discloses a holder for a milling cutter in which the cutter is attached to the holder by a cap screw arrangement, but none of the patents disclose arrangements having a bearing on the patentability of any claim of the present application.

SUMMARY OF THE INVENTION

An object and advantage of the present invention is to provide a tool or tool adapter that can be used for cutting and the like with a face for use in connection with millings, reaming, boring or a side milling machine. The device of the present invention is also capable of being used and fitted into a Jacobs drill chuck or spring collet.

An additional object of the present invention is to provide a simple, far more versatile adapter or cutter holder uncomplicated in structure, assembly and use and which provides an economically constructed holder that saves time in its use, assembly and disassembly from the tools or machines with which it can be used.

An additional and further object of the present invention is to provide a holder or adapter structure particularly useful with such tools as a table drill press, a radial drill press, a vertical mill, horizontal mills, lathe tail stock, reamers, and other similar machines.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE SEVERAL VIEWS OF THE DRAWINGS

FIG. 1 is a perspective view of the cutter holder with a cutter mounted thereon according to a preferred embodiment of the present invention.

FIG. 2 is a longitudinal sectional view of the device shown in FIG. 1 and in which the machine is shown in phantom.

FIG. 3 is an enlarged exploded group perspective view of the several components forming the multi-machine cutter adapter or holder.

DESCRIPTION OF A PREFERRED EMBODIMENT

Referring now to the drawings there is shown a multi-machine cutter adapter or holder 10 provided with a flanged piece or element 12 having a generally circular or cylindrical outer or peripheral surface 14, one side 15 of the flanged element having a support shaft or member 16 extending axially from the flanged element 12. The support member 16 has a cylindrical peripheral surface 18 and is adapted to be conveniently received within a chuck or jaw section of a machine shown in phantom as machine 20 in FIGS. 1 and 2.

The other side or surface 24 of the flanged element 12 is provided with a set of two diametrically oriented pin holes 26 for receiving in each of the holes one of the dowel pins 30. Each diameter of these holes 26 is spaced a common distance from the central axis of the flanged element and the size of each of the openings or holes 26 is commensurate so that the holder will not wobble or vibrate when it rotates about its axis at a high speed. Similarly dowel pins of a common weight and dimensions are inserted into the holes 26 and secured therein by conventional means such as a press fit, solder, a weld, glue and the like. The pins 30 extend outwardly from the surface 24, and coaxial with the flange there is a hub 34 similarly projecting outwardly from the surface 24 adapted for receiving a hollow portion 38 of a cutter element 40 having a circular base 42, a diametrically disposed key slot 44 for receiving abutment member or members such as dowel pins 30, the cutter 40 further including, for example, a shell end mill cutter structure 46 as shown in the drawings. The cutter 40 is secured onto the holder by means of a cap screw 50 having its head 51 holding a washer 52 onto a shoulder or bevel surface 54 of the cutter shown in FIG. 2 and the cap screw threadedly engaging a threaded opening 60 coaxially oriented within the hub as illustrated in FIGS. 2 and 3. The threaded opening 60 communicates with an air hole 62 and this is provided for other purposes and advantages. The cap screw 50 is provided with a button head or socket head recess 64 adapted to receive a matingly engaging socket wrench, as is well known in the art.

The diametrically disposed key slot 44 is also constructed so that it is dynamically balanced about the common longitudinal axis of the assembly. The key slot is shown as square but it may conveniently be of any similar configuration such that it is maintained dynamically balanced about its longitudinal axis, described above. By means of the present invention it is seen that there is provided a multi-machine cutter holder adaptable for support and rotation of tool adapters for receiving any of several cutter or load elements which are mounted upon the hub and secured as described above by the cap screw 50.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A holder device for holding in a jaw chuck and the like, a rotary work tool having a circular base defining a central opening and symmetrically disposed key slots extending radially from said opening, the holder device comprising a substantially circular flange with opposite surfaces, a support shaft extending axially from one surface of the flange for receipt in the jaw chuck and the like, a hub extending axially from the opposite surface of the flange for receipt in the central opening of said work tool, the hub including a threaded bore for receiving a screw to attach the work tool to the holder device, and abutment members projecting from said opposite surface of the flange, the abutment members being disposed symmetrically about the hub for receipt in the key slots of the work tool.

2. The invention of claim 1 wherein the abutment members comprise dowels secured in openings in the flange.

3. The invention of claim 1 wherein the flange, the shaft, and the hub comprise a unitary element.

4. The invention of claim 1 including an air passage extending axially through the shaft and communicating with said bore in the hub.

5. The invention of claim 1 wherein the abutment members are diametrically opposed on opposite sides of the hub.

6. In combination with a rotary work tool having a circular base defining a central opening and symmetrically disposed key slots extending radially from said opening, a holder device for holding the work tool in a jaw chuck and the like in a dynamically balanced condition, the holder device comprising a circular flange with opposite surfaces, a support shaft extending axially from one surface of the flange for receipt in a jaw chuck and the like, a hub extending axially from the opposite surface of the flange, the hub being received in said opening in the work tool, abutment members extending from said opposite surface of the flange, the abutment members being symmetrically disposed about the hub and being received in the respective key slots preventing the work tool from rotating relative to the holder device, and fastening means engaging the hub for securing the work tool on the holder device.

7. The invention of claim 6 wherein the fastening means comprises a screw threaded into a bore formed in the hub, the screw having a head holding a washer against a shoulder on the work tool surrounding said opening.

8. The invention of claim 6 wherein the work tool is a rotary cutter.

9. The invention of claim 6 wherein the key slots and the abutment members are diametrically opposed on opposite sides of the opening and hub respectively.

* * * * *